J. V. MEIGS.
Making Coffee.

No. 54,933.

Patented May 22, 1866.

Witnesses:
F. P. Meigs.
J. S. Peyton

Inventor:
Jos. V. Meigs

UNITED STATES PATENT OFFICE.

JOSIAH V. MEIGS, OF WASHINGTON, DISTRICT OF COLUMBIA.

APPARATUS FOR MAKING COFFEE.

Specification forming part of Letters Patent No. 54,933, dated May 22, 1866.

*To all whom it may concern:*

Be it known that I, JOE V. MEIGS, of Washington city, in the District of Columbia, have invented a new and useful Improvement in Apparatus for Making Coffee, of which the following is a full, clear, and exact description, reference being had to the accompanying drawings, which make part of this specification, and in which—

Figure 1:
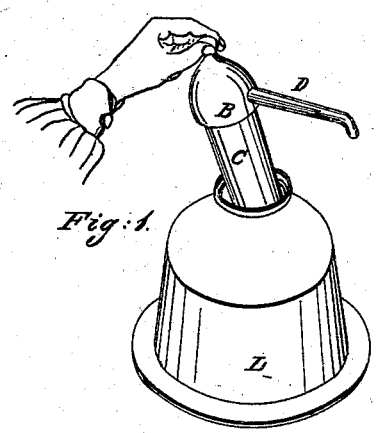
Figure 2:
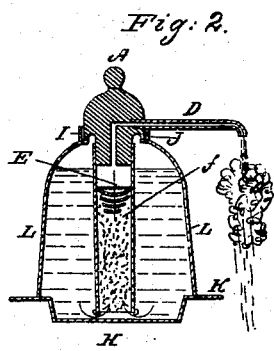
Figure 3:
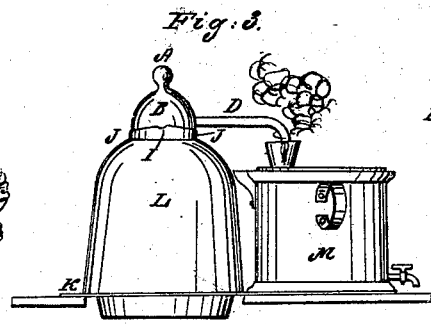
Figure 4:
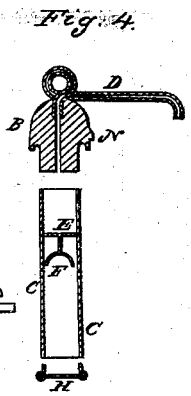
Figure 5:

Figure 1 is a view, in perspective, of my improved coffee-maker with the coffee chamber or tube partially withdrawn. Fig. 2 is a vertical central section through the same, with the tube in position for discharging the coffee, as in Fig. 3. Fig. 3 is a view in elevation, showing the apparatus on the stove discharging the coffee into a pot or urn. Fig. 4 is a vertical central section through the coffee-chamber, top, and spout, the latter, in this instance, forming a handle by which to lift the tube. Fig. 5 shows the apparatus as provided with a spring-top instead of a weighted one. Figs. 6, 7, 8, and 9 show various forms of checks or strainers for preventing the grounds from clogging the apparatus while permitting the passage of the coffee.

It is the object of my invention to provide an apparatus for making coffee upon philosophical principles, of the best quality to be procured from the berry, and yet so simple and certain in its operation that it can be successfully used by any person of ordinary intelligence, and, in fact, can scarcely be made to fail; and to these ends my invention consists, first, in inclosing the ground coffee in a chamber or tube having a perforated diaphragm or strainer at each end, and immersing it in boiling water, the tube and boiler being united by a joint which can be rendered steam-tight at pleasure, whereby I am enabled to extract the caffeine and force the steam and hot water to pass through the coffee-chamber, extracting and carrying off the caffeine with it; second, in combining a boiler or kettle with a chamber to contain the coffee, having a steam-tight joint, and so arranged as to compel the steam to escape through the coffee-chamber or through the joint, as may be preferred, whereby I am enabled at pleasure to suspend or resume the process of making coffee; third, the combination, with the coffee-tube, of a helical or spiral check to prevent the choking of the strainer; fourth, in so constructing a coffee-pot that the act of removing the coffee-chamber from the kettle shall condense the steam and cleanse the diaphragms by the rush of air to supply the vacuum thus created; fifth, in forming an inclined plane upon the upper edge of the kettle, and so combining the coffee-chamber therewith that the mere act of turning the chamber will open or close the joint between the chamber and kettle, so as to render it steam-tight or not at pleasure without danger of explosion.

The accompanying drawings exemplify what I now deem the best mode of carrying out the objects of my invention, although it is obvious that the details of my apparatus may be varied in many particulars without departing from the spirit of my improvement. In this instance a kettle or boiler, L, is shown as made of cast-iron and with a wide flange, K, at bottom, to adapt the kettle to openings of different sizes in the range or stove. A flange or ledge, consisting of inclined planes I J, is formed upon the top of the kettle. In Fig. 4 the spout is curved so as to form a handle, and a lug, *n*, formed upon the top to open or close the joint. A heavy stopper, B, is made to fit down upon the kettle with a steam-tight joint. It may also have a wooden knob, A, upon it for a handle, and a spout, D, communicating with a channel through it. A chamber or tube, C, fits upon this stopper B, and has a strainer, H, upon its lower end, and a similar one, E, near its upper one. Either or both of the strainers should be removable, to fill or empty or cleanse the chamber.

The following is the operation of the apparatus: The kettle L is filled about two-thirds full of water and placed upon the fire. The chamber C is filled with ground coffee and inserted into the kettle, with its spout D resting in the notch I at the top of the inclined plane, so as to leave the joint open. By this means when the water boils the steam escapes without passing through the coffee. The water, however, rises in the coffee-tube to the same level as in the kettle, and thus extracts the coffee from the grounds. To obtain the coffee the spout D is turned down to the bottom of the inclined plane, so as to make the joint tight. In a few moments, as the boiling continues, the pressure of the steam upon the surface of the water in the kettle forces the coffee out of the tube and discharges it from the spout, and this process may be continued until all the water in the kettle has been forced through the coffee. The flow, however, may be instantly checked by turning the spout so as to open the joint, and resumed by turning it back again. The water, in flowing through the coffee extracts all the caffeine. That which comes off first will, of course, be the strongest.

It will be observed that by my plan the coffee, itself does not boil, nor does any of it escape into the kettle except a small portion when the tube is lifted. The coffee may thus be immersed for a long time in boiling water without losing its aroma. A stop-cock or faucet might be placed in the spout still further to prevent the escape of the aroma, but such precaution will rarely be found necessary.

Figure 6:
Figure 7:
Figures 8, 9:
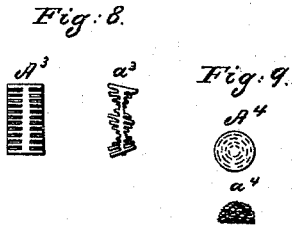

I have found by experiment that the upper strainer is very apt to become clogged by the coffee-grounds. To remedy this defect I apply beneath the strainer a check consisting of wire or sheet metal coiled in a spiral form. Various forms of checks are shown in Figs. 6, 7, 8, and 9. Fig. 6 shows a spiral cut out of a flat sheet, A', and then punched into the form shown at a'. Fig. 7 shows a check formed from wire. Fig. 8 consists of a sheet punched and twisted, and Fig. 9 shows a sheet perforated in unconnected curved slits and punched up. I deem the forms shown in Figs. 8 and 9 the best for use. These checks present a front nearly solid to the grounds, while the coffee passes in laterally.

Fig. 5 shows a top held down on the kettle by a spring instead of by its own weight, as in Figs. 1, 2, and 3.

The kettle might be formed, if desired, with a surrounding chamber, into which the coffee might be discharged and drawn off in any suitable manner.

It is obvious that my invention might be applied to making tea, beef-tea, tannin, or other extracts.

The top might be screwed down upon the kettle, and a safety-valve might be inserted in the kettle; but I prefer the method hereinbefore described.

What I claim as my invention, and desire to secure by Letters Patent, is—

1. Making coffee by inclosing the ground coffee in an immersed chamber through which hot water is forced, substantially in the manner herein described.

2. The combination of the kettle or boiler with the coffee-chamber, when arranged and operating substantially in the manner and for the purpose set forth.

3. The combination of the coffee-tube with a check, substantially as and for the purpose described.

4. Cleansing the coffee-tube by condensing the steam in it, as described.

5. The combination of the coffee-pot, coffee-chamber, and inclined planes I J, substantially as and for the purpose described.

In testimony whereof I have hereunto subscribed my name.

JOSIAH V. MEIGS.

Witnesses:
F. P. MEIGS,
J. I. PEYTON.